United States Patent [19]

Kassai

[11] Patent Number: 4,614,454
[45] Date of Patent: Sep. 30, 1986

[54] BABY CARRIAGE GRIP ROD LOCKING MECHANISM

[75] Inventor: Kenzou Kassai, Osaka, Japan

[73] Assignee: Aprica Kassai Kabushikikaisha, Osaka, Japan

[21] Appl. No.: 688,619

[22] Filed: Jan. 3, 1985

[30] Foreign Application Priority Data

Jan. 11, 1984 [JP] Japan .................................. 59-4101

[51] Int. Cl.$^4$ ............................................. F16C 11/00
[52] U.S. Cl. ........................................ 403/62; 403/93;
403/100; 403/102; 403/325; 16/354; 16/324;
280/644; 297/363
[58] Field of Search ....................... 403/62, 84, 92, 93,
403/96, 100, 101, 102, 325; 16/354, 324;
280/644, 642, 650, 658; 297/363, 355, 369

[56] References Cited

U.S. PATENT DOCUMENTS

| 477,109 | 6/1892 | Flocke | 16/324 |
|---|---|---|---|
| 575,266 | 1/1897 | Knoll et al. | 403/92 X |
| 635,744 | 10/1899 | Catudal | 403/96 X |
| 663,195 | 12/1900 | McGuire | 403/93 X |
| 698,137 | 4/1902 | Porter | 403/325 X |
| 2,632,440 | 3/1953 | Hauser et al. | 403/62 X |
| 2,683,321 | 7/1954 | Faber | 403/62 X |
| 4,191,397 | 3/1980 | Kassai | 280/650 X |

FOREIGN PATENT DOCUMENTS

| 4013 | of 1901 | United Kingdom | 403/62 |
|---|---|---|---|
| 26961 | of 1904 | United Kingdom | 403/62 |

Primary Examiner—Cornelius J. Husar
Assistant Examiner—Todd G. Williams
Attorney, Agent, or Firm—W. G. Fasse; D. H. Kane, Jr.

[57] ABSTRACT

A locking mechanism for locking two foldable sections (2a, 2b) of a grip rod (2) of a baby carriage has two gears (26) meshing with each other. The grip rod sections are foldably interconnected by a coupling (12) which supports the gears (26) for rotation around their respective axes. One end surface of each gear (26) is formed with a locking recess (29) for receiving a locking plate (20) in the locked state. The locking plate is movable axially of the gears (26) for unlocking. The locking plate (20) is urged by a spring (32) into the locking recesses (29) to maintain the locked state. A push button (23) moves the locking plate (20) out of the locking recesses (29) against the force of the spring (32) to permit the folding.

6 Claims, 22 Drawing Figures

BABY CARRIAGE GRIP ROD LOCKING MECHANISM

BACKGROUND OF THE INVENTION

This invention relates to a locking mechanism whereby the grip rod of a baby carriage, which interconnects the pair of push rods of the carriage and which is foldable at its middle, is locked in its straight state. More particularly, in a foldable baby carriage in which the distance between the push rods is increased or decreased when the baby carriage is opened or closed, it is necessary to inhibit the folding of the grip rod interconnecting the push rods when it is intended to firmly hold the baby carriage in an open, unfolded state. Thus, this invention is directed to a mechanism for locking the grip rod against being folded when the baby carriage is in its opened state.

Among typical examples of foldable baby carriages is one which has a pair of push rods constructed so that they are held relatively wide apart from each other when the baby carriage is in its opened state and relatively close to each other when it is in its closed state. In most cases, a grip rod is connected between such push rods. In baby carriages of the foldable type described above, such grip rod should be foldable, e.g., at its middle, so as to allow the movement of the pair of push rods toward and away from each other. The grip rod assumes a straight state when the baby carriage is in its opened state, so as to maintain the distance between the push rods at its maximum. To firmly maintain the opened state of the baby carriage, it is desirable that the foldable portion of the grip rod be locked in its straight state.

SUMMARY OF THE INVENTION

Accordingly, it is an object of this invention to provide a baby carriage grip rod locking mechanism whereby the grip rod can be stably and firmly locked against being folded.

Another object of the invention is to provide a baby carriage grip rod locking mechanism so designed that automatic locking is effected when the baby carriage is opened and such locking can be easily cancelled, when so desired, by a simple operation.

The locking mechanism according to the invention is arranged as follows. The grip rod is divided into two parts, which carry at one of their respective ends gears adapted to mesh with each other. The parts of the grip rod are connected together by a coupling. The coupling, when connecting the parts of the grip rod, supports the gears for rotation around their respective axes. One end surface of each gear has a locking recess. Further, there is provided a locking member which is movable axially of the gears for fitting in said locking recesses when the grip rod is in its straight state. The locking member is constructed of a plate-like member, for example. The locking member is urged by a spring in the direction in which it fits in the locking recesses. An operating member which operates in a push-button fashion, for example, is provided to impart an operating force for releasing the locking member from the locking recesses.

According to this invention, since the locked state is attained by the locking member fitting in the recesses of the two gears, the locked state thus attained is stable and firm, almost free from any play. Further, since the locking member is urged by a spring in the direction in which it fits in the locking recesses, the locked state can be automatically attained when the baby carriage is brought into its opened state. The locking can also be easily cancelled by a simple operation since it is only necessary to manipulate the operating member against the force of the spring.

These objects and other objects, features, aspects and advantages of the present invention will become more apparent from the following detailed description of the present invention when taken in conjunction with the accompanying drawings.

BRIEF DESCRIPTION OF THE DRAWINGS

The accompanying drawings illustrate an embodiment of this invention.

FIG. 21 is a view corresponding to FIG. 20, but showing the push button pushed in.

DETAILED DESCRIPTION OF PREFERRED EXAMPLE EMBODIMENTS AND OF THE BEST MODE OF THE INVENTION

Figure 1:
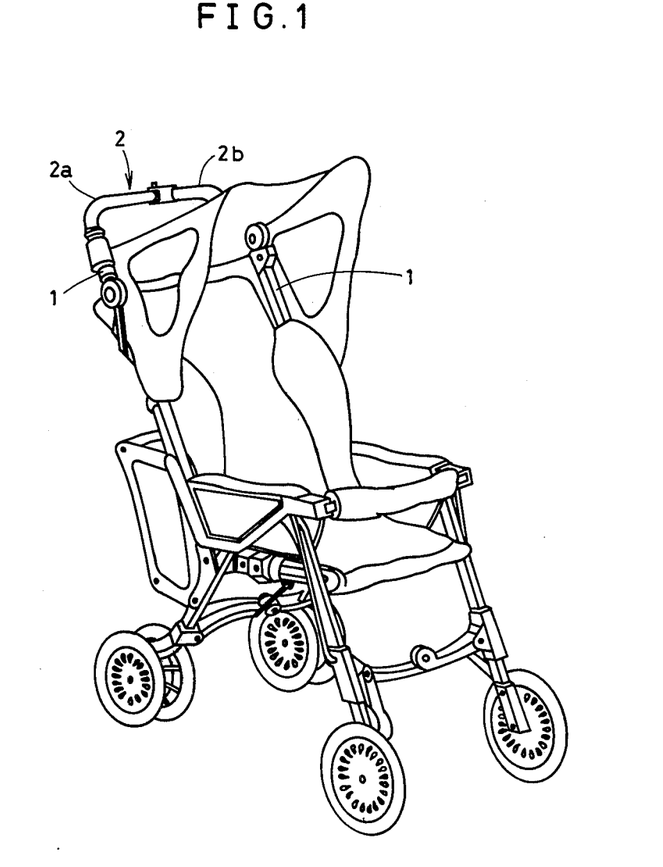
FIG. 1 is a perspective view of an example of a baby carriage having an embodiment of this invention applied thereto, showing the opened state of the baby carriage.
Figure 2:
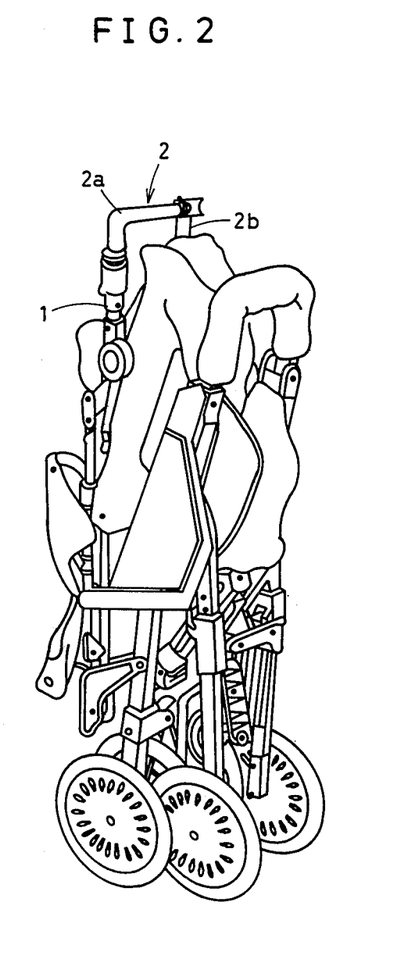
FIG. 2 is a perspective view showing the closed state of the baby carriage of FIG. 1.

FIGS. 1 and 2 show a typical example of a baby carriage in which this invention is incorporated. The carriage has a pair of push rods 1 and a grip rod 2 connected between said push rods 1. As shown in FIG. 1, when the baby carriage is in its opened state, the pair of push rods 1 are held relatively wide apart from each other, and when the baby carriage is in its closed state, as shown in FIG. 2, the distance between the push rods 1 is decreased. To allow such movement, the grip rod 2 is constructed foldable at its middle. The detailed folding construction of the grip rod 2 will now be described.

The arrangement of the elements shown in FIGS. 3 and 4 will now be described with further reference to FIGS. 5 to 18, whereby FIGS. 3 and 4 help understanding the relation among the elements to one another.

Figure 3:
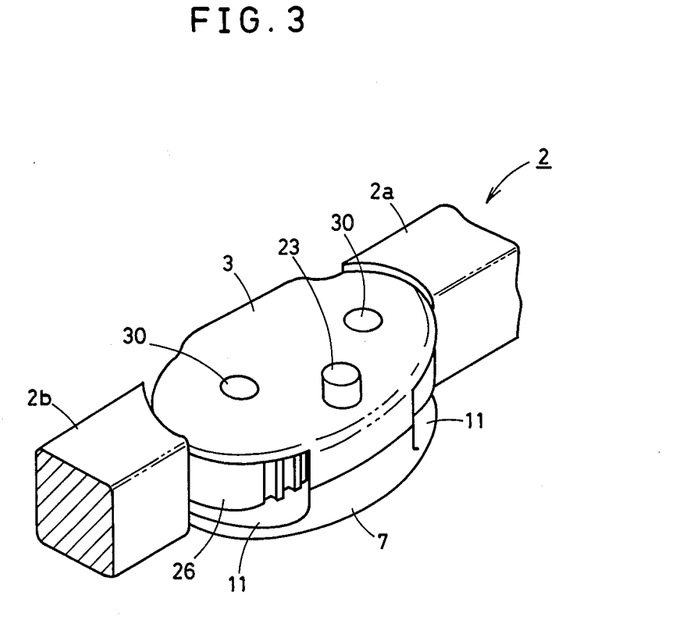
FIG. 3 is a perspective view showing the middle region of the grip rod of the baby carriage of FIG. 1.

The upper cover 3, as shown in FIG. 3, is positioned above the connecting portion between right-hand and left-hand side portions 2a and 2b into which the grip rod 2 is divided, so as to cover said connecting portion.

The upper cover 3 has a dish form with throughgoing holes 4 on both sides and a single throughgoing hole 5 in the middle front region. Further, the right and left sides of the upper cover 3 are provided with notches or cutouts 6.

Figure 10:
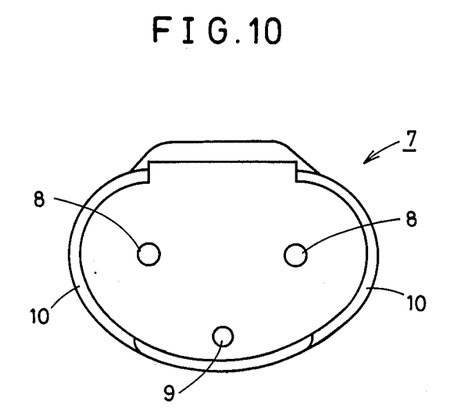
FIG. 10 shows a plan view of a lower cover also depicted in FIG. 3.
Figure 11:
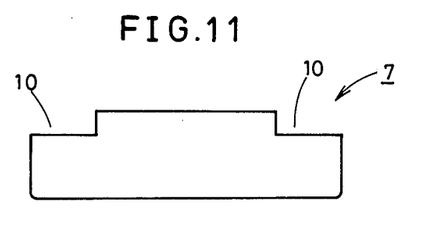
FIG. 11 is a front view of the cover of FIG. 10.
Figure 12:
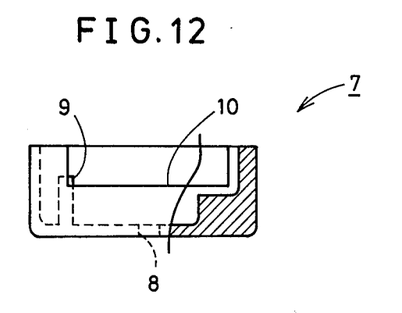
FIG. 12 is a right-hand side view of the cover of FIG. 10.
Figure 13:
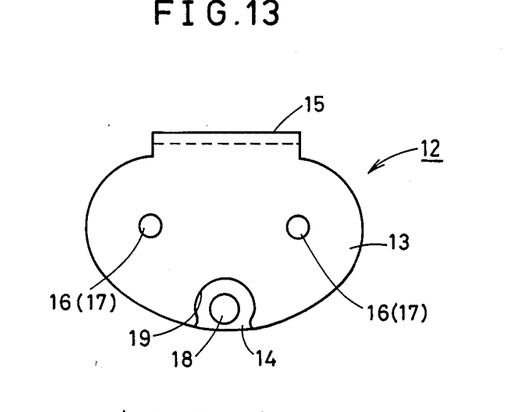
FIG. 13 shows a plan view of a coupling also depicted in FIG. 4.
Figure 14:
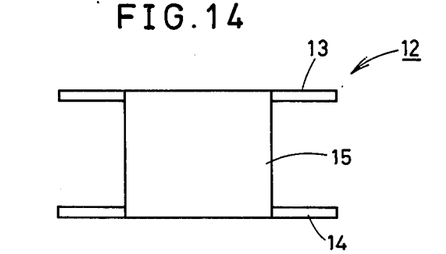
FIG. 14 is a back view of the coupling of FIG. 13.
Figure 15:
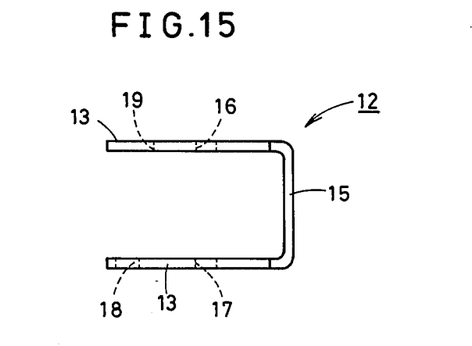
FIG. 15 is a right-hand side view of the coupling of FIG. 13.

The lower cover 7, shown in FIG. 3 and in FIGS. 10 to 12, is paired with the upper cover 3 and is positioned below the connecting portion between the right-hand and left-hand side portions 2a and 2b of the grip rod 2 so as to cover the connecting portion.

The lower cover 7 also has a dish form as a whole. The lower cover 7 is provided with throughgoing holes 8 at locations corresponding to the throughgoing holes 4 of the upper cover 3. The cover 7 is also provided with a cylindrical projection 9 at a location corresponding to the throughgoing hole 5 of the upper cover 3. Further, the right and left sides of the lateral surface of the lower cover 7 are provided with notches 10 corresponding to the notches 6 of the upper cover 3. As shown in FIG. 3, when the upper and lower covers 3 and 7 are put together, the notches 6 and 10 cooperate with each other to define horizontal windows 11.

The coupling 12 shown in FIGS. 4 and 13 to 15 serves to interconnect the right-hand and left-hand side portions 2a and 2b of the grip rod 2. The coupling 12 comprises upper and lower walls 13 and 14 and a vertical wall 15 interconnecting the upper and lower walls 13, 14. The upper wall 13 is provided with throughgoing holes 16 and the lower wall 14 with throughgoing holes 17, corresponding to the throughgoing holes 4 of the upper cover 3 and the throughgoing holes 8 of the lower cover 7, respectively. Further, the lower wall 14 is provided with a throughgoing hole 18 to receive the projection 9 on the lower cover 7. The upper cover 3 is provided with a notch 19 at a location corresponding to the throughgoing hole 5 of the upper cover 3.

Figure 4:
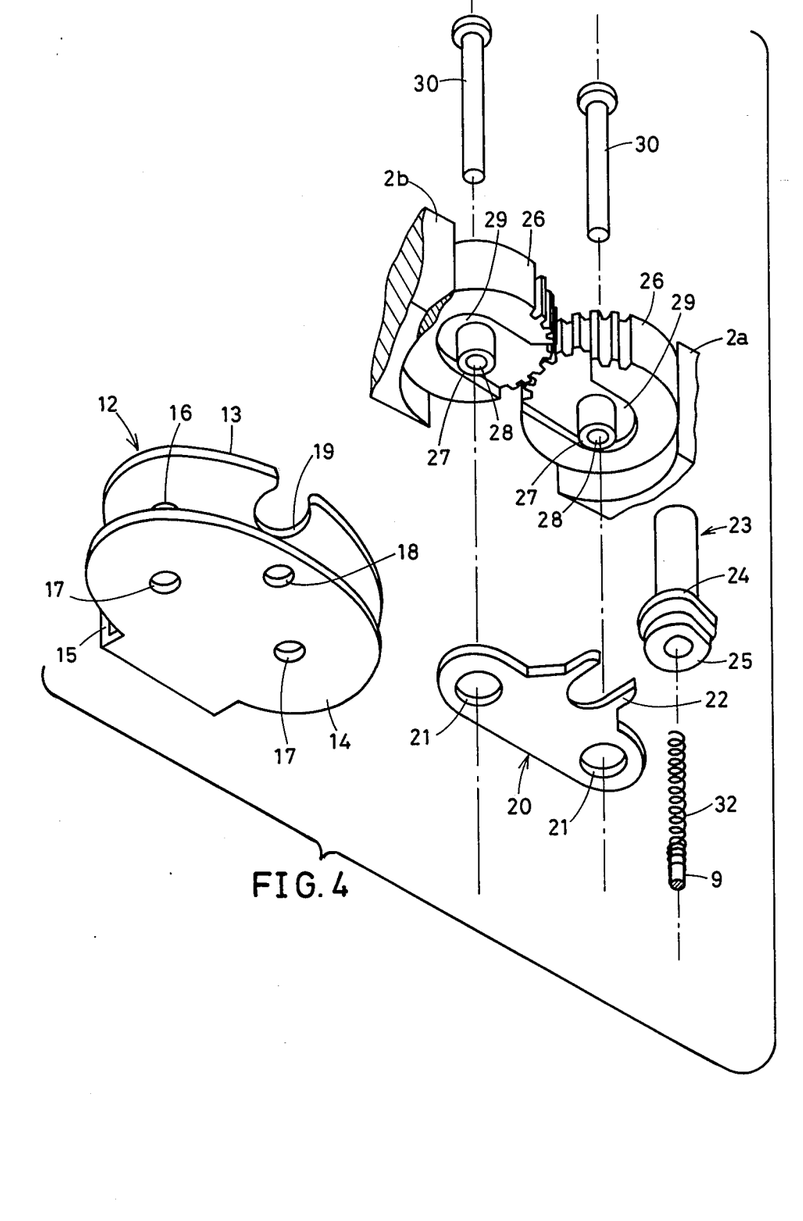
FIG. 4 is a perspective view taken from below wherein elements of the locking mechanism disposed in the middle region of the grip rod are shown disassembled.
Figure 5:
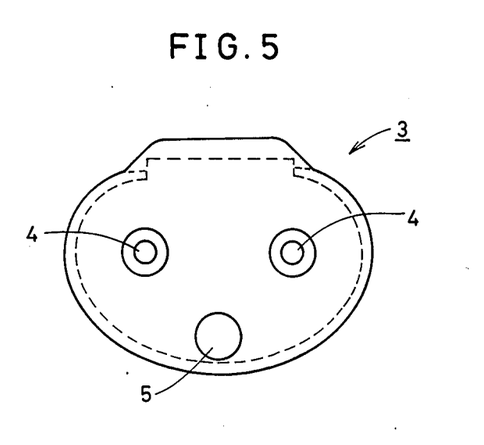
FIG. 5 shows a plan view of an upper cover also depicted in FIG. 3.
Figure 6:
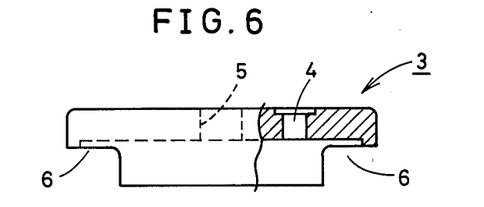
FIG. 6 is a front view partly in section of the cover of FIG. 5.
Figure 7:
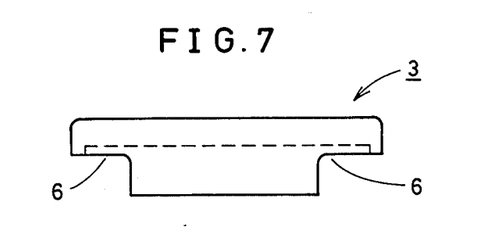
FIG. 7 is a back view of the cover of FIG. 5.
Figure 8:
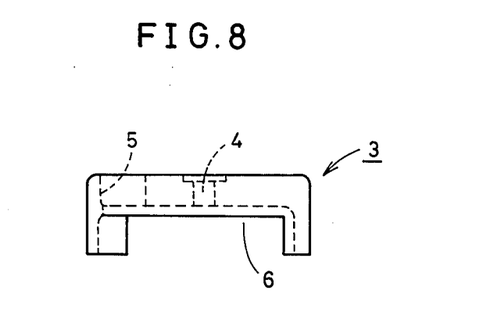
FIG. 8 is a right-hand side view of the cover of FIG. 5.
Figure 9:
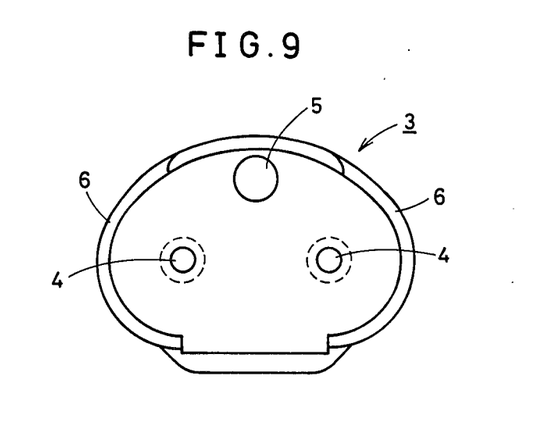
FIG. 9 is a bottom view of the cover of FIG. 5.
Figure 16:
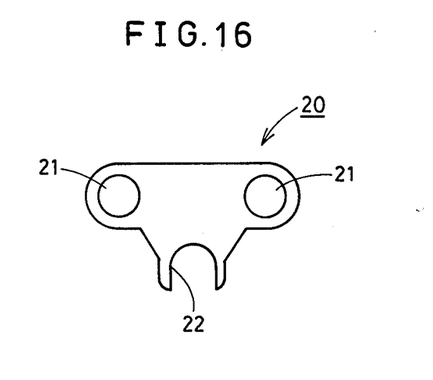
FIG. 16 is a plan view of a locking plate 20 which is also shown in FIG. 4.

The locking plate 20 shown in FIGS. 4 and 16 has the form of a T-shaped plate as a whole. The right and left sides of the locking plate 20 are provided with throughgoing holes 21. The center distance between the pair of throughgoing holes 21 is selected so that it is equal to the respective center distances between the respective pairs of throughgoing holes 4, throughgoing holes 8, throughgoing holes 16 and throghgoing holes 17. The base portion of the T of the locking plate 20 is provided with a notch 22. The push button 23 shown in FIGS. 4, 17, and 18 a projects with its upper end above the upper cover 3 as shown in FIG. 3.

Figure 17:
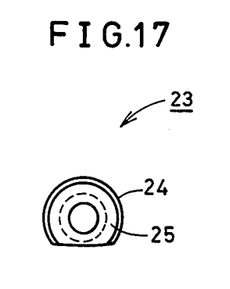
FIG. 17 shows a bottom view of a push button also depicted in FIGS. 3 and 4.
Figure 18:
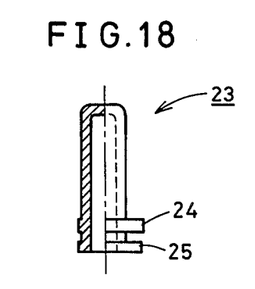
FIG. 18 is a left-hand side view of the push button of FIG. 17.

The push button 23 has the form of a cylindrical body which is open at its lower end having on its lower end portion two spaced flanges 24 and 25.

Figure 19:
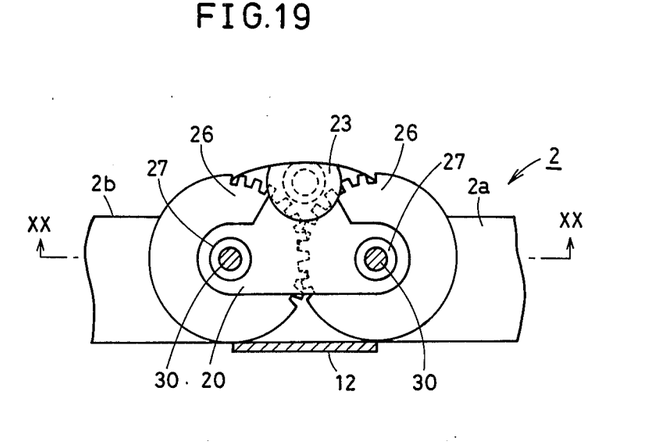
FIG. 19 is a view, taken from below, of the middle region of the grip rod, with some parts being omitted from the illustration but showing the push rod.

FIG. 19 shows the connecting portion between the right-hand and left-hand side portions 2a and 2b of the grip rod 2 shown in FIG. 3, the view being taken from below, with the lower cover 7 and the lower wall 14 of the coupling 12 being omitted from the illustration. The middle connecting portion of the grip rod 2 is shown assembled in FIGS. 10 and 20. Thus, the assembled state of the parts which have been described with reference to FIGS. 3 to 18 will be described with reference to FIGS. 19 and 20 and FIGS. 3 and 4.

The respective ends of the right-hand and left-hand side portions 2a and 2b of the grip rod 2 are provided with gears 26 meshing with each other. The gear teeth on each gear are formed only in the required region. Each gear has a centrally boss 27 having a throughgoing hole 28 extending through each gear 26.

The end surface of each gear 26 where the boss 27 is provided has a locking recess 29. The contour of the locking recesses 29 of the gears 26 corresponds to that of the locking plate 20. The locking plate 20 is installed in the recess 29 so that it is movable axially of the gears 26 with the throughgoing hoes 21 of the locking plate 20 receiving the bosses 27 of the gears 26.

The push button 23 is positioned in the notch 22 of the locking plate 20. The locking plate 20 is held between the two flanges 24 and 25 of the push button 23, whereby the axial movement of the push button 23 is transmitted to the locking plate 20.

The two gears 26 and the locking plate 20 are disposed between the upper and lower walls 13 and 14 of the coupling 12. The upper and lower covers 3 and 7 are then positioned above and below the coupling 2 to hold the latter therebetween. In this state, two pins 30 are inserted from above successively through the throughgoing holes 4, 16, 28, 17, and 8, the lower ends of the pins 30 being crimped as at 31 (FIG. 20), whereby the parts including the upper and lower covers 3 and 7 are mechanically held.

Figure 20:
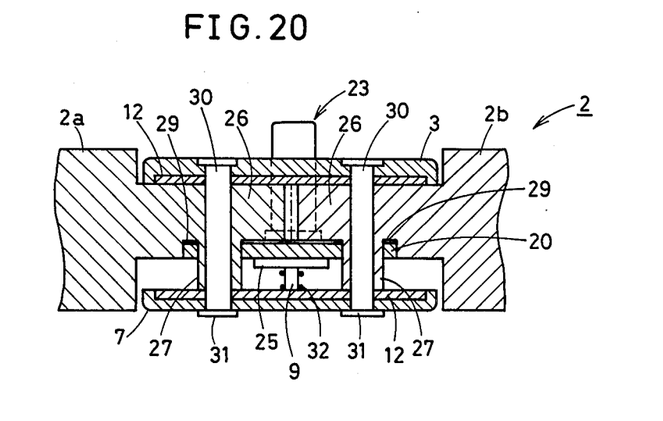
FIG. 20 is a sectional view taken along the line XX—XX of FIG. 19 showing the push button in its "out" position.

In the assembled state described above, the projection 9 on the lower cover 7 extends through the throughgoing hole 18 in the lower wall 14 of the coupling 12 to project upwardly beyond the lower wall 14. The projection 9 is received in the lower end opening in the push button 23 to guide the axial movement of the push button 23. A coiled compression spring 32 surrounds the projection 9, with the ends of said compression spring 32 abutting against the upper surface of the lower wall 14 of the coupling 12 and against the upper end wall of the inner space of the push button 23, respectively. Thus, the push button 23 is constantly urged upwardly. The push button 23 extends through the notch 19 in the upper wall 13 of the coupling 12 to project outwardly beyond the throughgoing hole 5 of the upper cover 3.

With the aforesaid assembling operation completed, if the grip rod 2 is in its straight state, the push button 23 will be in its upwardly displaced position under the action of the spring 32. Therefore, the locking plate 20 held by the bush button 23 also assumes its upper position, thus fitting in the locking recesses 29 formed in the two gears 26. As a result, the rotation of the gears 26 is inhibited and hence the straight state of the grip rod 2 is firmly maintained.

Figure 21:
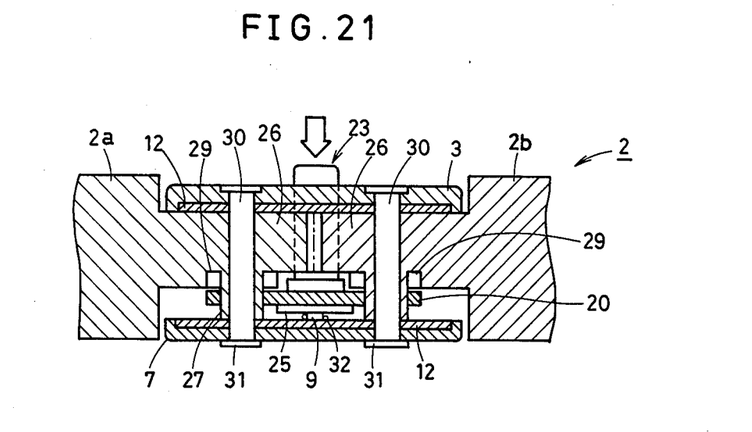

When it is desired to cancel the locking, this can be attained simply by pushing in the push button 23 as shown in FIG. 21. The push button 23 is pushed in against the force of the compression spring 32, whereby the locking plate 20 is moved downwardly. As a result, the locking plate 20 is disengaged from the locking recesses 29. This state does not prevent rotation of the gears 26 but rather allows the gears to rotate around the pins 30 while meshing with each other.

Figure 22:
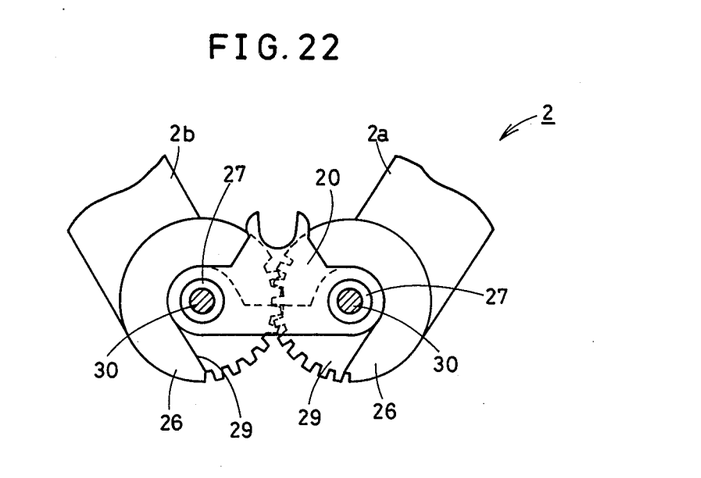
FIG. 22 is a view corresponding to FIG. 19, but showing the right-hand and left-hand side portions of the grip rod in the folded state.

FIG. 22 shows the state which is established after the gears have been rotated. FIG. 22 shows the parts depicted in FIG. 19, the view being taken in the same direction, with the coupling 12 and push button 23 being omitted from the illustration, as compared with FIG. 19. When the gears 26 are rotated as shown in FIG. 22, the right-hand and left-hand side portions 2a and 2b of the grip rod 2 assume their folded state, corresponding to the closed state of the baby carriage shown in FIG. 2.

When the baby carriage is brought from this closed state back to its opened state shown in FIG. 1, the grip rod 2 is straigthened and the aforesaid locking action by the looking plate 20 is automatically attained. More particularly, when the locking plate 20 is aligned with the locking recesses 29 during the change from the FIG. 22 state to the FIG. 19 state, the locking plate 20 simultaneously fits in the locking recesses 29 through the push button 23 under the action of the compression spring 32.

The invention has been described so far in connection with the illustrated embodiment, but the invention is not limited to the embodiment described above. For example, the configurations of the locking plate and locking recesses could be variously changed. Further, the foldable baby carriage to which the invention is applied is not limited to the type shown in FIGS. 1 and 2. The invention is applicable to any type of baby carriage provided that it has a grip rod which interconnects a pair of push rods and which is foldable at its middle.

Although the present invention has been described and illustrated in detail, it is clearly understood that the same is by way of illustration and example only and is not to be taken by way of limitation, the scope of the present invention being limited only by the terms of the appended claims.

What is claimed is:

1. A locking mechanism for locking a foldable grip rod of a baby carriage in a straight, unfolded state, comprising: two grip rod sections having inner rod ends facing each other, a gear member at each inner rod end, coupling means for foldably interconnecting said grip rod sections and for supporting said gear members so that said gear members are rotatable around their respective axes, two locking recesses, one formed in one side wall of each of said gear members, two bosses (27), one extending out of each of said recesses, a locking member having two spaced through-holes (21) for receiving said two bosses, whereby said locking member is movable axially along said bosses of said gear members, said locking member being capable of simultaneously resting in both locking recesses when said grip rod is in it straight state for arresting said grip rod sections in said straight state, a spring for urging said locking member into said locking recesses for said arresting, an operating member for disengaging said locking member from said locking recesses against the force of said spring by axially moving said locking member guided by said bosses in said through-holes, and means for tiltably supporting said gear members in said coupling means.

2. The locking mechanism of claim 1, wherein said locking member is a plate guided by said bosses passing through said through-holes, and wherein said means for tiltably supporting said gear members comprise two bores each extending axially through its respective gear member and its respective boss, and journal members (30) extending through said axial bores and through said coupling means for permitting rotation of said gear members in an unlocked state.

3. The locking mechanism of claim 1, wherein said coupling means comprise upper and lower walls and a vertical wall interconnecting said upper and lower walls, said gear members and said locking member being disposed between said upper and lower walls.

4. The locking mechanism of claim 3, wherein said operating member is a push button which is so installed that the pushing direction coincides with the direction of movement of said locking member, and wherein said push button engages said locking member for unlocking said locking member.

5. The locking mechanism of claim 4, wherein said upper wall of said coupling means comprise an opening, one end of said push button projecting upwardly through said opening in said upper wall of said coupling means, the other end of said push button being located opposite said lower wall of said coupling means, and wherein said spring is a compression spring disposed between said lower wall and said push button.

6. The locking mechanism of claim 5, wherein said push button has an open ended cavity, a portion of said spring being received in said cavity of said push button.

* * * * *